(12) United States Patent
Kunow et al.

(10) Patent No.: US 7,401,506 B2
(45) Date of Patent: Jul. 22, 2008

(54) MEASUREMENT METHOD AND DEVICE FOR THE MEASUREMENT OF A PATH COVERED

(75) Inventors: Peter Kunow, Berlin (DE); Klaus Biester, Wienhausen (DE)

(73) Assignee: Cameron International Corporation, Houston, TX (US)

( * ) Notice: Subject to any disclaimer, the term of this patent is extended or adjusted under 35 U.S.C. 154(b) by 56 days.

(21) Appl. No.: 10/558,577

(22) PCT Filed: May 28, 2004

(86) PCT No.: PCT/US2004/017052

§ 371 (c)(1), (2), (4) Date: Nov. 29, 2005

(87) PCT Pub. No.: WO2005/001391

PCT Pub. Date: Jan. 6, 2005

(65) Prior Publication Data

US 2006/0283242 A1    Dec. 21, 2006

(30) Foreign Application Priority Data

Jun. 2, 2003   (DE) .................................. 10324838

(51) Int. Cl.
*G01L 1/04* (2006.01)
(52) U.S. Cl. ........................................ 73/161
(58) Field of Classification Search .................... 73/161
See application file for complete search history.

(56) References Cited

U.S. PATENT DOCUMENTS

| | | | |
|---|---|---|---|
| 3,780,817 A | | 12/1973 | Videon |
| 4,033,181 A | * | 7/1977 | Oeser ............................ 73/800 |
| 4,631,478 A | * | 12/1986 | Knetsch et al. ......... 324/207.13 |
| 5,020,460 A | * | 6/1991 | Babson et al. .......... 112/475.03 |
| 5,832,774 A | * | 11/1998 | Smith ............................ 73/161 |
| 5,847,290 A | | 12/1998 | Kim |
| 5,975,508 A | * | 11/1999 | Beard ........................... 267/136 |
| 6,039,344 A | | 3/2000 | Mehney et al. |
| 6,178,829 B1 | * | 1/2001 | Ferguson ................. 73/862.391 |
| 6,267,679 B1 | * | 7/2001 | Romano ........................ 464/58 |
| 6,695,996 B2 | * | 2/2004 | Chou ........................... 264/40.5 |
| 7,026,599 B2 | * | 4/2006 | Gombert ...................... 250/221 |

OTHER PUBLICATIONS

International Search Report for Appl. No. PCT/US04/17052 dated May 16, 2005; (5 p.).

* cited by examiner

*Primary Examiner*—Max Noori
(74) *Attorney, Agent, or Firm*—Conley Rose, P.C.

(57) ABSTRACT

With a measurement method and a measurement device for the measurement of a path covered by a first object (1) in relation to a second object (2), a measurement body (3) is deformed by a relative movement of the objects and at least a first deformation sensor (4) assigned to the measurement body (3) converts the measurement body (3) deformation into a measurement signal. The measurement signal is converted by an evaluation device (20) into information on the path covered. In order to increase the precision and measurement speed in a way that is simple structurally and saves space, the measurement signal is emitted when an area of the measurement body (3) is stretched along the longitudinal axis (6) of the measurement body (3) and a further area is compressed along the longitudinal axis (6) of the measurement body (3).

29 Claims, 2 Drawing Sheets

MEASUREMENT METHOD AND DEVICE FOR THE MEASUREMENT OF A PATH COVERED

CROSS-REFERENCE TO RELATED APPLICATION

The present application claims priority to PCT/US2004/017052 filed 28 May 2004 and to German Application No. 10324838.2 filed 2 Jun. 2003, all hereby incorporated herein by reference.

STATEMENT REGARDING FEDERALLY SPONSORED RESEARCH OR DEVELOPMENT

Not Applicable.

BACKGROUND OF THE INVENTION

The invention relates to a measurement method and a measurement device for the measurement of a path covered by a first object in relation to a second object. A measurement body is deformed by the relative movement of the two objects. At least one first deformation sensor assigned to the measurement body converts the measurement body deformation into a measurement signal. This measurement signal is subsequently converted by means of an evaluation device into corresponding information on the path covered giving the relative movement of the two objects in relation to each other.

Such a measurement method and such a measurement device are known from practice. For example, corresponding information on the path can be obtained by capturing a pressure change in the assigned deformation sensor caused by a corresponding deformation of the measurement body and converting this pressure change to the path covered by the objects moving in relation to each other. Other measurement methods and devices are also known in which information on the path covered is captured without deformation of a corresponding measurement body such as, for example, using analogue-digital sensors in accordance with DE 202 03 298.

Such measurement methods and/or devices can be used in various areas. One area of application is in petroleum and gas extraction and there, in particular, in equipment such as valves, restrictors, blow-out valve systems and similar. In such equipment, an adjusting element is displaced, in each case, inside a corresponding housing and its position, or the path covered by it, is monitored for control. As a rule, the paths covered are relatively small.

In particular, in the area of application mentioned, it should be noted that the equipment is exposed in some cases to considerable temperature differences or also to major differences in pressure. In addition, it is generally located in inhospitable and inaccessible places.

BRIEF SUMMARY OF THE PREFERRED EMBODIMENTS

The object of the invention is to improve a measurement method and device as described at the beginning so that measurement of the path covered is possible with them with a high level of precision and at great speed in a way that is simple structurally and that saves space.

It should be noted at this point that a corresponding path measurement can serve as the basis for corresponding speed and acceleration measurements, whereby, in addition to capturing the path and thus associated path changes or position changes, a time basis is also required. A time basis of this sort can also be integrated according to the invention so that naturally, alongside the path, the speed and acceleration can also be determined.

According to the invention, the object is solved by the features of Patent claims 1 and/or 6.

According to the invention it is not necessary that a corresponding measurement sensor for example should move in relation to the measurement body or that, in any other way, a movement of the measurement body in relation to the objects should occur. Instead, the measurement body is deformed by the movement of the corresponding object(s) and the measurement body and deformation sensor form a simply structured, easy to handle unit. The simple allocation both of the measurement body to the objects and of the deformation sensor to the measurement body means that there is no need for any complicated calibration or similar. In addition, the measurement is very precise and is carried out simultaneously with the deformation of the measurement body, i.e. is very quick.

It is sufficient here if the deformation sensor is located along an area of the measurement body which has been stretched or compressed during deformation of the measurement body. The expansion or compression of the deformation sensor thus leads to a corresponding change in a physical property which can be measured and which can be converted into a corresponding change in the position of the objects in relation to each other or into a path covered.

To obtain a more precise measurement signal, a second deformation sensor can be arranged along, for example, the compressed area with the first deformation sensor along the stretched area, or vice versa. The corresponding change in the physical property occurs in the opposite direction with the first and second deformation sensor. It is also possible to arrange two deformation sensors in each case along the compressed and stretched area.

A further possibility for deformation of the measurement body is a torsional deformation in which the measurement body is twisted essentially around the longitudinal axis of the measurement body with the relative movement of the first and second object. In this case too, there is a stretched and a compressed area along which the deformation sensors can once again be arranged.

In this context, an essentially spiral-shaped wound arrangement in relation to the longitudinal axis of the measurement body is an advantage, whereby at least the two deformation sensors are arranged spirally in opposite directions.

The first and second measurement signals of the deformation sensors can be evaluated jointly to compensate in particular for temperature drift and be converted into information on the path covered. It is possible that the deformation sensor is formed on or in the surface of the measurement body by a corresponding processing of the measurement body. This can be done, for example, by the application of a corresponding coating. It is also possible to arrange the deformation sensor as a separate component on the surface of the measurement body. The deformation sensor in question can be fixed, for example, by gluing or similar.

In a simple embodiment, the physical property can be the electrical resistance. With this physical property, the extent to which, in particular, changes in cross-section of the corresponding deformation sensor due to stretching or compression can affect the electrical resistance and thus the measured signal is well known.

Simple embodiments of the measurement body are essentially all bodies which can be elastically deformed in the measurement range and in which stretched and compressed areas of the body occur with this deformation. An example of a measurement body of this type is, for example, an elastically flexible rod made from a corresponding flat profile, partly pre-tensioned, if applicable, between the objects. When the objects come closer, the rod bends outwards so that a compressed area is formed on one side of the flat profile and a stretched area is formed on the other side of the flat profile. The corresponding deformation sensors can be arranged along these areas.

A further simple embodiment of such a measurement body is a spring. In this, corresponding compression or stretching produces a certain torsion of the spring material along the spring coils, whereby a deformation sensor wound correspondingly spirally around the spring coils is stretched and a deformation sensor wound spirally in the opposite direction is compressed.

Similarly, the measurement body can also be a spring bar with deformation sensors wound round in opposite directions, whereby with a spring bar of this type, torsion likewise occurs as the deformation around its measurement body longitudinal axis.

In order not to corrupt the measurement signal, the deformation sensor may advantageously be electrically insulated from the measurement body.

If the deformation sensor is simply formed as an electric conductor, it can also be for example a conductive wire fixed to the surface of the measurement body. It may have a round or a flat cross-section. The diameter of such a conductive wire is in the range of a few millimeters and is advantageously less than 1 mm or in particular not greater than 0.5 mm. Copper or a different conductive metal may be used as the material for such conductive wires. It is also possible to use corresponding alloys made, for example, from Ni, Cr with the addition, if applicable, of portions of Al, Cr, Mn or similar as the material.

In one embodiment, the deformation sensors may be contacted at each of their two ends in order to obtain the measurement signal. It is also possible for the two deformation sensors, for example, to be connected with each other at one end so that only three different contact points are necessary.

In order to receive the corresponding measurement signal simply and precisely, at least the first and second deformation sensor can be connected up in a bridge circuit, especially a Wheatstone bridge. This bridge circuit serves to determine the corresponding electrical resistance and/or the change in the resistance of the deformation sensors induced by the stretching or compression. It is also possible, if four deformation sensors are used, to connect up all of these in the bridge circuit, which gives in principle a full bridge circuit.

With a corresponding arrangement of the deformation sensors in the bridge circuit, temperature compensation is superfluous, since the sensors are exposed to the same temperature changes because of their arrangement. This also applies similarly for any pressure changes which may occur.

In order, if necessary, to be able to do without a separate supply lead to the ends of the deformation sensors connected with each other, the measurement body can be connected so that it is electrically conductive and in the bridge circuit. This means that the measurement body also forms a part of the bridge circuit.

In order to prevent in this connection, with electrically conductive objects, interference of the measurement signal, the measurement body can be electrically insulated in relation to the first and/or second object. In this way, the signal is returned from the bridge circuit via the measurement body to one object or contact only and can be picked up there via the object itself or corresponding supply leads.

In order to simplify the evaluation of the measurement signals, the bridge circuit can be connected with an evaluation device. This can have a corresponding input and/or output device. Using the input device it is possible to initiate and/or calibrate a measurement and/or to change the specifications for the measurement device. Using the output device, the path measurement can simultaneously be output, if necessary, along with an additional speed or acceleration measurement. The evaluation device can be arranged at a distance from the actual measurement device, so that, for example, with petroleum or natural gas extraction, the evaluation device can be located onshore or offshore, whilst the actual measurement device is positioned on the sea bed or in other distant locations. The transmission of the signals between the measurement device and the evaluation device can take place in this connection via existing electrical lines or wirelessly.

Advantageously, the bridge circuit can be allocated a control circuit. This can be used, for example, to recalibrate the corresponding zero point of the bridge circuit in the event of signs of ageing of the measurement body or similar. The corresponding control circuit can be formed as an integrated circuit with corresponding connections. This means that it is possible to house the entire electronics for the control circuit on a single chip so that only an extremely small amount of space is required.

As regards the measurement body, it should also be noted that it is elastically deformable and thus essentially only the elastic properties of the measurement body are of interest, whilst the actual material for the measurement device has no effect. This means that the measurement body can be made from steel, titanium, copper or similar.

BRIEF DESCRIPTION OF THE DRAWINGS

In the following, advantageous embodiments of the invention are explained using the figures in the drawing enclosed herewith.

The following are shown.

DETAILED DESCRIPTION OF THE PREFERRED EMBODIMENTS

Figure 1:
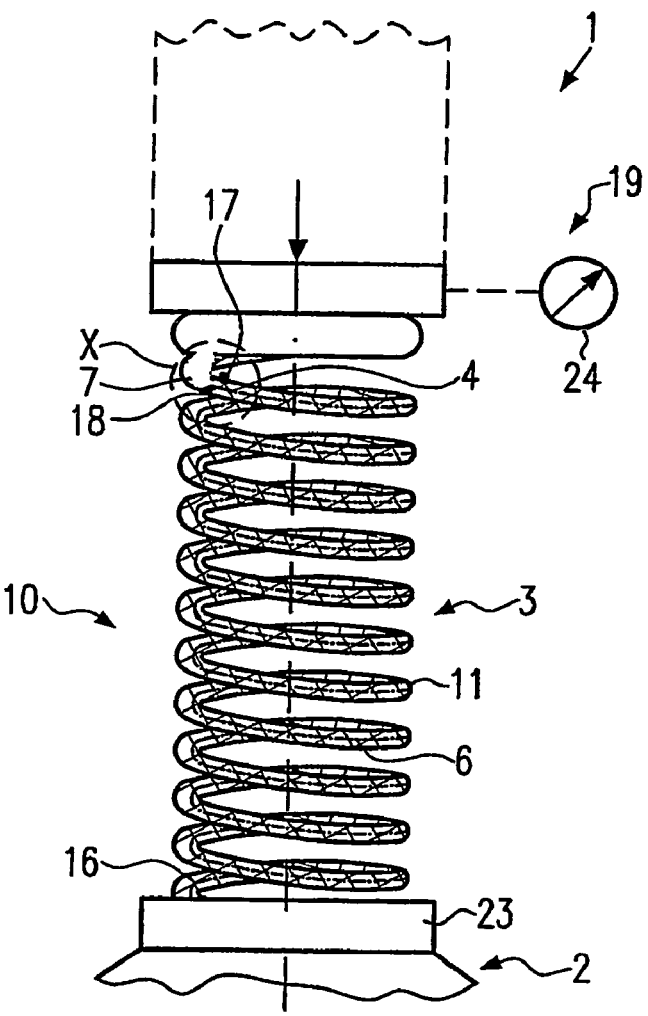
FIG. 1 shows a side view of a first embodiment of a measurement device according to the invention.

FIG. 1 shows a side view of a first embodiment of a measurement device 10 according to the invention. This is arranged between a first object 1 and a second object 2. At least one of objects 1 or 2 can be a part of the measurement device 10.

In the embodiment shown, the first object 1 is movable in relation to the second object 2. If the first object 1 correspondingly moves closer to or away from the second object 2, a measurement body 3 of the measurement device 10 is deformed and in particular compressed or stretched in areas. The measurement body 3 is a spring 11 in the embodiment shown. On its surface 13, see also FIG. 2, as the first and second deformation sensor, 4 and 7 respectively, an electrical conductor 14 is wrapped spirally around a corresponding measurement body longitudinal axis 6 of the spring 11. Here, the first deformation sensor 4 is wound in the opposite direction to the second deformation sensor, so that for example the first deformation sensor 4 is wound in a clockwise direction and the second deformation sensor 7 in an anti-clockwise direction around the spring 11 or its coils. The electrical conductor 14 is formed as a conductive wire 15. It is also possible for a corresponding electrical conductor 14 to be incorporated directly onto the surface of the spring 11 or into its surface. Electrical insulation is provided between the electrical conductor 14 and the spring 11.

The two deformation sensors 4, 7 are connected with each other at their ends 16 assigned to the second object 2, whilst the opposite ends 17, 18 are connected separately to a corresponding voltage supply. The two deformation sensors 4, 7 and the spring 11 are connected with each other in the form of a bridge circuit, especially a Wheatstone bridge circuit 9 (see also FIG. 3).

For decoupling from the second object 2, an electrically insulating disc 23 made for example from plastic or similar is arranged between it and the measurement device 10.

As regards the longitudinal axis 6 of the measurement body, it should be noted at this point that this goes along the various coils in the direction of the spring 11 and is then wrapped round accordingly by the first and the second deformation sensors 4, 7. In a further embodiment, two deformation sensors could be assigned each to the stretched and compressed area of the measurement body, with the four sensors then being connected up into a full bridge circuit.

Figure 3:
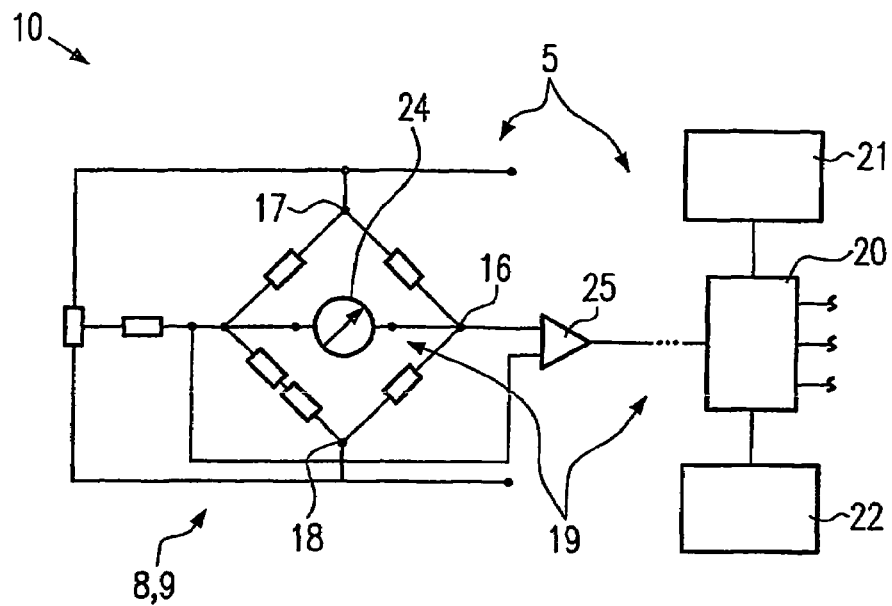
FIG. 3 shows a diagram of the principle of a bridge circuit with evaluation device and control circuit.

As a part of a control circuit 19, which is assigned to the Wheatstone bridge circuit 9, see FIG. 3, FIG. 1 shows a measurement instrument 24.

Figure 2:
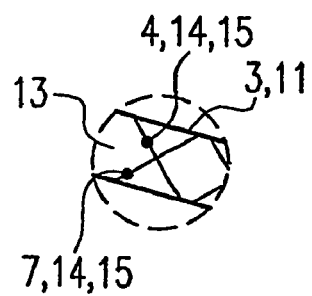
FIG. 2 shows an enlarged view of a detail "X" from FIG. 1.

FIG. 2 shows a detail X from FIG. 1 in enlarged form. In this detail, it can be see that the deformation sensors 4, 7 are wound spirally around the corresponding coils of the spring 11 as the measurement body 3. At certain points, the deformation sensors 4, 7 formed as conductive wires 15 overlap. With this separate form in relation to the spring 11, the conductive wires 15 are fixed for example on the surface 13 using a corresponding adhesive. In the production of the measurement device 10, this can be done manually or using a corresponding winding machine. In an embodiment with a common lower end 16, both deformation sensors 4, 7 are formed by one conductive wire 15, which after reaching the lower end 16 is wound again around the spring 14, in the opposite direction, back to the corresponding upper end. The conductive wires may have a round or a flat cross-section. The diameter of the conductive wires is generally only a few millimeters and preferably less than 1 mm and, particularly preferably, not more than 0.5 mm. The diameter depends here on, for example, the size of the measurement body 3, the conductive wire material, its resistance and further other requirements, depending on the use of the measurement device 10 according to the invention. For example, the wire may consist of copper or another conductive material. It is also possible to use alloys for the conductive wire such as, for example, those containing nickel and chromium, if necessary with other alloy components such as aluminium, silicon or similar. To insulate the conductive wire against the spring, an oxidised surface of the conductive wire may be sufficient, or a corresponding insulating coating on the conductive wire. Depending on the resistance of the conductive wire especially if this is not too low, voltages of up to and even more than 20 volts may be used, which will provide a power signal that is sufficient to evaluate the measurement result.

As regards the function of the measurement device 10 according to the invention, it should be pointed out at this point that the corresponding measurement body 3, see also the further embodiments, undergoes, as a result of the movement of the first and second objects 1, 2, such a deformation that it shows compressed and stretched areas along its measurement body longitudinal axis 6. Here, at least one of the deformation sensors is essentially assigned to the compressed and at least the other of the deformation sensors is assigned to the stretched area. Due to the corresponding stretching or compression of the deformation sensors 4, 7 a change occurs in a physical property of the corresponding material, whereby in the embodiment shown this is a change in the electrical resistance. This change in the electrical resistance is captured and converted into a measurement signal. This is then converted by a corresponding evaluation device 5, see for example FIG. 3, into a path or position signal. If the course of the change in position or path over time is known, the speed and acceleration of the measured movements can also be calculated.

FIG. 3 shows a diagram of the principle of a corresponding bridge circuit 9 as a part of the evaluation device 5 of the measurement device 10. A part of the circuit 9 built as a Wheatstone bridge circuit is formed by the first deformation sensor 4 or the corresponding conductive wire which runs between the ends 16 and 17. A further part of the bridge circuit is formed by the second deformation sensor 7, or the corresponding conductive wire 15, which runs between the ends 16 and 18. Finally, the spring 11 forms part of the bridge circuit, whereby this is essentially connected between the ends 17, 18 and the common end 16 of the connective wires 15. FIG. 3 symbolically shows the corresponding resistances both of the conductive wire 15 which forms the first and second deformation sensor 4, 7, and also of the spring 11. The corresponding signal is picked up via an amplifier 25 and forwarded to a processor 20 for further processing. The processor 20 can have a series of further outlets and be connected for example with an input device 21 and an output device 22. This part of the evaluation device 5, that is to say processor 20, input device 21 and output device 22, can be arranged at a distance from the actual measurement point and the corresponding bridge circuit. If the measurement device 10 according to the invention is used for example for petroleum or natural gas extraction, the bridge circuit may be positioned locally, and, for example, on the sea bed, whilst the above-mentioned remotely located part of the evaluation device 5 can be positioned for example offshore or onshore.

A temperature compensation for the first and second deformation sensors 4, 7 is not necessary with the measurement device 10 according to the invention, since the corresponding conductive wire 15 of both deformation sensors undergoes the same temperature changes because of the spatially close positioning of the sensors and so the temperature is automatically compensated for the bridge circuit. This also applies similarly for changes in other physical parameters such as pressure or similar.

In one embodiment, the spring admittedly is used as a part of the Wheatstone bridge circuit. However, only the corresponding spring constant plays a part in the evaluation, whilst the actual material of the spring, whether it is steel, titanium, copper or similar, has no part to play.

The Wheatstone bridge circuit is, furthermore, allocated a control circuit 19, see for example FIG. 3, which is used for calibration and recalibration of the bridge circuit. The recalibration is particularly advantageous if, after intensive use or use over a long time of the measurement device 10 according to the invention, a degree of wear or ageing of for example the spring occurs. The control circuit can be used to recalibrate the zero point of the Wheatstone bridge circuit simply in this context so that the measurement device 10 according to the invention remains fully functional. In this context, the control circuit can also be located at a distance from the actual bridge circuit, whereby the corresponding re-adjustment (recalibration) or also the initial adjustment of the bridge circuit can be carried out with software using a corresponding microprocessor. Here, the entire control circuit can also be realised in an integrated circuit which is extremely small and only requires little design work and a small amount of space.

Figure 4:
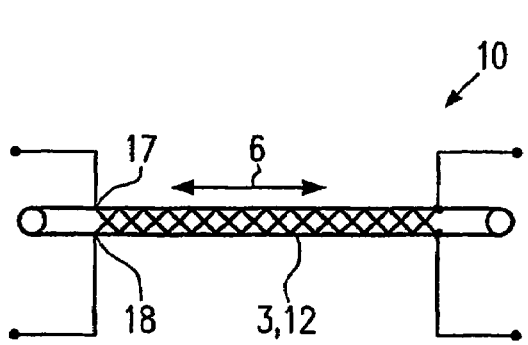
FIG. 4 shows a second embodiment of the measurement device according to the invention.
Figure 5:
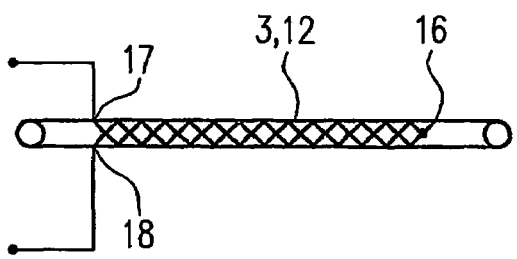
FIG. 5 shows the embodiment according to FIG. 4 in a slightly different form and FIG. 6 shows a third embodiment of the measurement device according to the invention.
Figure 6:
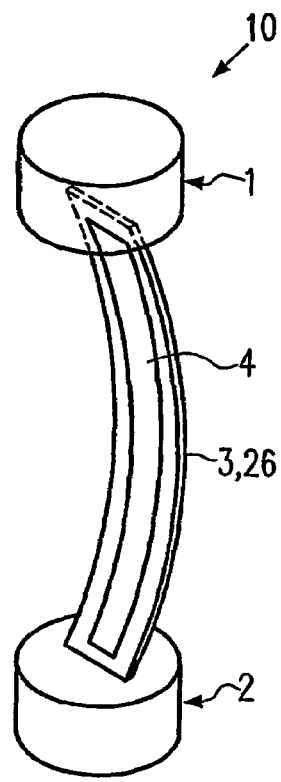

What was said previously also applies by analogy for the further embodiments of the measurement device 10 according to the invention as shown in FIGS. 4 to 6. Here, the illustrations of these embodiments are essentially limited to the measurement body 3 and the first and second deformation sensor 4, 7.

In the embodiment according to FIG. 4, the measurement body 3 is formed by a spring bar 12. With this, it is known that, if it is correspondingly stretched or compressed, it twists around its solid body longitudinal axis 6. Because of the corresponding spiral winding of the two deformation sensors 4, 7, one of these is allocated to an area of the spring bar 12 that is In contrast to the embodiment shown in FIG. 1, in FIG. 4 the corresponding voltages for each of the conductive wires 15 forming the first and second deformation sensors 4, 7 respectively are picked up separately. That is to say, the conductive wires 15 are separately wound and not connected with each other at one end.

In the embodiment according to FIG. 5, a spring bar 12 is again used as a measurement body 3. In this case, the arrangement of the conductive wire 15 for the first and second deformation sensors 4, 7 is the same as in FIG. 1. That is to say, essentially only one conductive wire 15 is used and the voltage is picked up at end 16, whilst the power source is connected to the individual ends 17, 18.

In the last embodiment according to FIG. 6, a bending bar 26 is used as a measurement body 3 as a simplification of the invention. Like the other measurement bodies 3 according to the previous embodiments, this is also elastically deformable, whereby in FIG. 6 the bending bar 26 is deflected sideways when the first and second object 1, 2 approach. A certain side deflection already exists in the initial state of the objects 1, 2, so that this bending is enlarged during the corresponding approach. The first deformation sensor 4 is arranged on one side of the bending bar 26, which is generally formed from a flat profile. In the illustration shown in FIG. 6, the sensor is arranged in the compressed area of the measurement body 3. It is possible only to use this first deformation sensor 4. If at least the second deformation sensor 7 is used as well, this is positioned on the opposite side of the bending bar 26, that is to say in the stretched part of the measurement body and along the measurement body longitudinal axis.

If two deformation sensors 4, 7 are used, the corresponding bridge circuit according to FIG. 3 can again be used.

According to the invention, a measurement method and device are provided according to various embodiments which allow a very precise and very quick measurement of a correspondingly covered path or of the position of objects moving in relation to each other. Such objects moving in relation to each other exist for example in a valve, a restrictor, a blow-out valve system (blow-out preventer) or other devices used in petroleum and natural gas extraction. The invention can thus be used for example to capture the precise position of a valve slide in a valve, whereby the opening of the valve slide is known at all times because of the position of the valve slide.

According to the invention, furthermore, the sensor arrangement is temperature-independent and pressure-independent and the sensor arrangement may be formed directly in or on the surface of a corresponding measurement body or affixed to it. The measurement body must only be sufficiently elastically deformable in order to show a compressed and a stretched area for the use of two deformation sensors.

The invention claimed is:

1. A method for measuring a path traveled by a first object relative to a second object, comprising:
    deforming a measurement body by moving the first object relative to the second object;
    deforming a first deformation sensor and a second deformation sensor in response to the deformation of the measurement body;
    emitting a signal from each sensor indicative of the deformation; and
    evaluating the signals to determine the path traveled by the first object relative to the second object.

2. The method according to claim 1, wherein the measurement body comprises a helix and the first deformation sensor winds along the helix.

3. Measurement method for the measurement of a path covered by a first object in relation to a second object, whereby a measurement body is deformed by the relative movement of the objects and at least one first deformation sensor assigned to the measurement body converts the measurement body deformation into a first measurement signal and then an evaluation device converts the first measurement signal at least into information on the path covered, comprising:
    the measurement body undergoes a deformation in which it is stretched in an area along a measurement body longitudinal axis and compressed in a further area along the measurement body longitudinal axis, whereby the first deformation sensor is stretched or compressed in one of the areas and a change in a physical property of the first deformation sensor caused by the stretching/compression is emitted as the first measurement signal; and
    at least a second deformation sensor arranged essentially spirally around the measurement body longitudinal axis in the opposite direction to the first deformation sensor emits a second measurement signal.

4. Measurement method according to claim 3, wherein the first and second measurement signals are evaluated jointly to compensate for temperature drift and converted into information on the path covered.

5. Measurement method according to claim 3, wherein the first and second deformation sensors and the measurement body are arranged in an electrical bridge circuit to measure the electrical resistance as a physical property.

6. An apparatus for measuring a path traveled by a first object relative to a second object, the apparatus comprising:
    a measurement body that is deformable when the first object moves relative to the second object;
    a first deformation sensor and a second deformation sensor, each sensor deformable by the deformation of the measurement body and able to emit a measurement signal corresponding to its deformation; and
    an evaluation device capable of evaluating the signals to determine the path traveled by the first object relative to the second object.

7. The apparatus according to claim 6, wherein the measurement body comprises a helix and the first deformation sensor winds along the helix.

8. The apparatus according to claim 6, wherein the second deformation sensor winds along the helix in a direction opposite that of the first deformation sensor.

9. The apparatus according to claim 6, wherein each deformation sensor comprises a physical property that changes in response to the deformation of the sensor and wherein the change in the physical property results in a change in the measurement signal.

10. The apparatus according to claim 9, wherein the physical property comprises electrical resistance.

11. The apparatus according to claim 6, wherein the measurement body comprises a spring.

12. The apparatus according to claim 6, wherein the measurement body comprises a spring bar.

13. The apparatus according to claim 6, wherein the deformation sensors comprise conductors arranged on a surface of the measurement body and electrically insulated from the measurement body.

14. The apparatus according to claim 13, wherein each conductor comprises a conductive wire fixed on the surface of the measurement body.

15. The apparatus according to claim 6, wherein each conductive wire is glued on the surface of the measurement body.

16. Measurement device for the measurement of a path covered by a first object in relation to a second object with at least one measurement body which can be deformed by the relative movement, to which at least a first deformation sensor is allocated to produce a measurement signal corresponding to the deformation, comprising:
  the deformed measurement body is stretched in an area along a measurement body longitudinal axis and is compressed in a further area along its measurement body longitudinal axis, whereby the first deformation sensor is essentially positioned along one of the areas; and
  wherein the first and second deformation sensors are connected at one end with each other and at their other ends in each case to a power source.

17. Measurement device for the measurement of a path covered by a first object in relation to a second object with at least one measurement body which can be deformed by the relative movement, to which at least a first deformation sensor is allocated to produce a measurement signal corresponding to the deformation, comprising:
  the deformed measurement body is stretched in an area along a measurement body longitudinal axis and is compressed in a further area along its measurement body longitudinal axis, whereby the first deformation sensor is essentially positioned along one of the areas; and
  at least the first and second deformation sensors are connected up in a bridge circuit.

18. Measurement device according to claim 17, wherein the measurement body is electrically conductive and is connected up in the bridge circuit.

19. Measurement device for the measurement of a path covered by a first object in relation to a second object with at least one measurement body which can be deformed by the relative movement, to which at least a first deformation sensor is allocated to produce a measurement signal corresponding to the deformation, comprising:
  the deformed measurement body is stretched in an area along a measurement body longitudinal axis and is compressed in a further area along its measurement body longitudinal axis, whereby the first deformation sensor is essentially positioned along one of the areas; and
  the measurement body is electrically insulated in relation to the first and/or second object.

20. The apparatus according to claim 17, wherein the bridge circuit is connected to the evaluation device.

21. The apparatus according to claim 17, wherein the bridge circuit is assigned a control circuit.

22. The apparatus according to claim 21, wherein the control circuit is formed with corresponding connections as an integrated circuit.

23. The method according to claim 2, wherein the second deformation sensor winds along the helix in a direction opposite that of the first deformation sensor.

24. The method according to claim 23, wherein processing the signals comprises compensating for temperature drift.

25. The method according to claim 23, further comprising:
  arranging the first and second deformation sensors and the measurement body in an electrical bridge circuit to measure the deformation of at least one of the sensors; and
  wherein emitting the signal from each sensor comprises emitting a signal indicative of the electrical resistance of each sensor.

26. The apparatus according to claim 6, wherein the first and second deformation sensors are connected at one end with each other and at their other ends to a power source.

27. The apparatus according claim 6, wherein the first and second deformation sensors are connected in a bridge circuit.

28. The apparatus according to claim 27, wherein the measurement body is electrically conductive and is connected in the bridge circuit.

29. The apparatus according to claim 6, wherein the measurement body is electrically insulated from at least one of the first object and the second object.

* * * * *